United States Patent [19]

Marius

[11] Patent Number: 4,875,964

[45] Date of Patent: Oct. 24, 1989

[54] LIQUID MIXTURES BASED ON ETHYLENE POLYMERS, A PROCESS FOR PRODUCING THEM AND A COATING OR BONDING PROCESS IN WHICH THEY ARE USED

[75] Inventor: Hert Marius, Aubigny En Artois, France

[73] Assignee: Societe Chimique Des Charbonnages S.A., France

[21] Appl. No.: 942,384

[22] PCT Filed: Apr. 29, 1986

[86] PCT No.: PCT/FR86/00146

§ 371 Date: Dec. 16, 1986

§ 102(e) Date: Dec. 16, 1986

[87] PCT Pub. No.: WO86/06398

PCT Pub. Date: Nov. 6, 1986

[30] Foreign Application Priority Data

May 2, 1985 [FR] France .............................. 85 06646

[51] Int. Cl.$^4$ .............................................. C09J 5/00
[52] U.S. Cl. .................................... 156/327; 156/334; 427/154; 427/385.5; 524/549; 526/272
[58] Field of Search ...................... 524/549; 427/385.5, 427/154; 156/327, 334; 526/272

[56] References Cited

U.S. PATENT DOCUMENTS 3,215,657 11/1965 Beresniewicz et al. ............. 524/549

*Primary Examiner*—John J. Gallagher

*Attorney, Agent, or Firm*—Finnegan, Henderson, Farabow, Garrett & Dunner

[57] ABSTRACT

The liquid mixtures according to the invention comprise at least one ethylene polymer (A) and at least one solvent (B), and are characterized in that:
  (a) the ethylene polymer (A) comprises at least one terpolymer having a fluidity index comprised between 2 and 500 dg/min and comprising:
    from 83 to 95.7 moles % of units derived from ethylene,
    from 4 to 15 moles % of units derived from at least one alkyl acrylate or methacrylate, the alkyl group having from 1 to 6 atoms of carbon, and
    from 0.3 to 2 moles % of units derived from maleic anhydride,
  (b) the solvent (B) is selected from amongst aliphatic, cycloaliphatic and aromatic hydrocarbons having from 5 to 12 atoms of carbon, dechlorinated solvents and esters.

The process comprises in a first step the dissolution of polymer (A), by stirring, in the solvent (B) at a temperature T (expressed in Celcius degrees) such that: $35 \leq T \leq \theta$, $\theta$ being the boiling temperature of the solvent (B).

Application to the coating of a support or to the bonding of two substrates by steeping in or spraying of a liquid mixture comprising a solvent and, optionally, evaporation of said solvent.

13 Claims, No Drawings

LIQUID MIXTURES BASED ON ETHYLENE POLYMERS, A PROCESS FOR PRODUCING THEM AND A COATING OR BONDING PROCESS IN WHICH THEY ARE USED

The document US-A-4,001,159 describes an aqueous dispersion of an olefin-acrylate copolymer comprising from 5 to 60 mol% of an olefin containing from 3 to 20 carbon atoms, from 40 to 95 mol% of acrylate and from 0 to 30 mol% of a compound chosen from acryloyl halides and maleic anhydride, the said copolymer being present in a proportion of 1 to 300 parts by weight per 100 parts by weight of water. Since the olefin-acrylate copolymer is soluble in many solvents such as hydrocarbons, esters, ketones, amides, ethers and halogenated hydrocarbons, the aqueous dispersion may be produced by first preparing a solution with a viscosity ranging up to 60 poises and then dispersing the solution in water and, finally, removing the solvent. To produce a stable aqueous dispersion, the dispersion must be performed in the presence of a preferably nonionic or anionic surface-active agent, used in a proportion of 0.1 to 20% by weight relative to the olefin-acrylate copolymer.

Document FR-A-2,386,402 describes a process for coating a substrate with a layer of polymer, the said process comprising:

(a) the preparation of a suspension of polymer in an organic liquid, (b) the coating of the substrate using the said suspension of polymer, (c) the removal of the organic liquid; the said process being characterized in that the polymer suspension is obtained by quenching a solution of the said polymer. The polymers envisaged include a polyethylene grafted with a small quantity of an unsaturated carboxylic acid such as (meth)acrylic acid. The organic liquid may be a solvent for the said polymer, such as, in particular, a paraffinic hydrocarbon. The polymer concentration in the suspension is preferably below 8% by weight. The quenching operation is preferably performed at a temperature not exceeding 50° C.

A first object of the present invention consists of liquid mixtures comprising at least one ethylene polymer (A) and at least one solvent (B), which are characterized in that:

(a) the ethylene polymer (A) comprises at least one terpolymer having a flow index of between 2 and 500 dg/min and comprising:
 some 83 to 95.7 mol% of units derived from ethylene, from 4 to 15 mol% of units derived from at least one alkyl acrylate or methacrylate, the alkyl group containing from 1 to 6 carbon atoms, and from 0.3 to 2 mol% of units derived from maleic anhydride, (b) the solvent (B) is chosen from aliphatic, alicyclic and aromatic hydrocarbons containing from 5 to 12 carbon atoms, esters and chlorinated solvents.

According to a preferred embodiment of the present invention, the terpolymer has a number average molecular mass Mn which is greater than or equal to 5,000 and/or a polydispersity index (defined as the ratio of the weight average molecular mass Mw to Mn and calculated from the distribution curve of molecular masses, which is obtained by gel permeation chromatography) greater than 5. As possible examples of solvents (B) there may be mentioned, in particular: n-pentane, n-hexane, methylcyclohexane, n-heptane, xylene, styrene, white spirit, a hydrocarbon cut containing from 9 to 12 carbon atoms such as that marketed under the trademark Isopar, phthalate esters such as butyl phthalate, and chlorinated solvents such as trichloroethylene and perchloroethylene.

The liquid mixtures according to the invention may be divided up into two categories:

on the one hand, the homogeneous solutions of at least one ethylene polymer (A) in at least one solvent (B), and on the other hand, the aqueous emulsions produced from the abovementioned homogeneous solutions.

In order to retain the ease of use of the homogeneous solutions, it is desirable that their viscosity should not exceed a certain limit, as is known to the specialist. For this reason, the concentration of the terpolymer in the solvent (B) is preferably lower than or equal to 40% by weight, this limit being the lower the lower the flow index of the terpolymer and the lower the temperature; for example, the concentration of a terpolymer with a flow index equal to 7 dg/min should not exceed approximately 15% by weight at 30° C. However, by starting with the polymer (A) as defined above, it is possible to obtain more concentrated solutions (for example 50% by weight) which are particularly suitable for being converted into emulsions.

The liquid mixtures according to the invention may furthermore comprise at least one (colouring pigment) (such as a phthalocyanine) in a proportion which is lower than or equal to 2% by weight based on the polymer (A) and/or at least one (agent for modifying or crosslinking) the polymer (A) (such as a heavy alcohol, a mono-, di- or trialkanolamine, or alternatively a polyfunctional alcohol) in a proportion which is lower than or equal to 2 mol% based on the polymer (A).

The aqueous emulsions according to the invention comprise from 50 to 200 parts by weight of water containing at least one (surface-active agent,) per 100 parts by weight of the mixture of polymer (A) and solvent (B). The surface-active agents which may be used for the emulsions according to the invention are preferably nonionic agents such as polyether oxides; they are generally present in a proportion of 0.5 to 10% by weight based on the polymer (A). The emulsions according to the invention may additionally comprise, on the one hand, at least one (antifoaming agent) such as methanol in a proportion of at most 5% by weight based on the water and, on the other hand, at least one (agent for chemically modifying) the terpolymer, such as aqueous ammonia, in a proportion of at most 2 mol% based on the terpolymer. The emulsions according to the invention additionally preferably comprise at least one (water-soluble polymeric stabilizer) such as a polyacrylamide, partially ionized or otherwise, a polyvinyl alcohol or a cellulose ether, in a proportion of 0.01 to 0.2% by weight based on water.

A second subject of the present invention is a process for producing the liquid mixtures described earlier, characterized in that, in a first stage, it comprises dissolving the polymer (A), by stirring, in the solvent (B) at a temperature T (expressed in degrees centigrade) such that:

$$35 \leq T \leq \theta,$$

$\theta$ being the boiling temperature of the solvent (B). The solutions produced using this process are completely homogeneous and may be cooled down to ambient temperature without losing their homogeneity.

To produce aqueous emulsions, the process according to the invention is characterized in that it comprises, in a second stage, the gradual addition, with intense stirring, at a temperature of between 35 and 100° C., of a mixture of water, surface-active agent and, if appropriate, an antifoaming agent and/or a chemical modifier. The water-soluble polymeric stabilizer may be added either during or after this second stage.

According to a preferred alternative form, the aqueous emulsions are obtained by introducing the solution of polymer (A) and of solvent (B) into the aqueous phase.

A third subject of the present invention consists of a process for coating a substrate by dipping into or by spraying a liquid mixture comprising at least one ethylene polymer (A) in at least one solvent (B), characterized in that the said liquid mixture is a mixture such as described earlier. When the liquid mixture employed is a solution in a solvent with a low boiling point, the coating is ultimately obtained after evaporation of the said solvent. It is also possible to obtain a coating without evaporation of the solvent if the latter is a solvent which has a high boiling point and if the concentration of polymer (A) is high (for example at least equal to 30% by weight). Examples of such solvents are: a saturated $C_{10}$–$C_{12}$ hydrocarbon cut, flux oils, and butyl phthalate. When the liquid mixture employed is an aqueous emulsion, the coating process according to the invention comprises the evaporation of the water and, where appropriate, that of the solvent if a solvent having a low boiling point is involved.

The substrates to which the coating process according to the invention is applicable may be of various natures: metals, synthetic resins, glass, and the like.

The coating process according to the invention may, in particular, be advantageously used to protect (against glass splinters) receptacles such as, in particular, test tubes, user-openable pharmaceutical ampoules, for the adhesive-coating of wires or fibres or metal components used in the manufacture of rubber or elastomeric articles such as, in particular, tire reinforcements, and for sizing glass fibres used, for example, as a reinforcing agent for thermoplastic materials.

The coating process may result either in protection due to an adhesive coating or protection of the substrate due to a nonadhesive coating. This second variation is of particular interest for the protection of metal surfaces against impacts and scratches. After the equipment comprising these protected metal surfaces has been installed, the protective coating may be readily removed simply by being peeled off. To produce this result, the solutions according to the invention contain a small quantity of a release agent; silicone oil may be used, for example in concentrations of the order of 0.5% based on the solution.

Another subject of the invention consists of a process for bonding two substrates by means of an adhesive, characterized in that the adhesive consists of a solution or of an emulsion such as have been described above or of the product obtained after evaporation of the solvent and, where applicable, of the water.

Thus, a substrate may receive an adhesive coating and the latter may be used to receive a second substrate, being thus responsible for the bonding between the two substrates. In an application of this type, a second substrate which can be mentioned may be:

an ink (the coating according to the invention is then used as a primer coating on, for example, a nonprintable polymer such as polyethyleneterephthalate), or a textile (the coating according to the invention may thus be used for fusible printing for interlining.

The following examples are given by way of illustration and without limiting the present invention. The parts are parts by weight, unless stated otherwise.

EXAMPLE 1

1 part of a terpolymer with a flow index of 4 dg/min and comprising 89 mol% of ethylene, 10 mol% of ethyl acrylate and 1 mol% of maleic anhydride, is dissolved at 40° C. in 10 parts of xylene, with stirring. The terpolymer used has a molecular mass Mn of 18,000. The solution obtained retains its homogeneity after cooling to ambient temperature.

EXAMPLE 2

The polymer solution prepared in accordance with Example 1 is used to coat a steel plate with adhesive by dipping followed by drying under vacuum. This plate is then bonded, using heat-bonding at 120° C. at 10 bars and for 5 minutes, to a 1.6 mm thick sheet of an ethylene/propylene/diene rubber with a flow index of 0.2 dg/min, marketed under the trademark Dutral 054.

The peel strength of the rubber, measured in accordance with the ASTM standard D 903-49, is 2.5 kg/cm.

EXAMPLE 3 (COMPARATIVE)

The experiment in Example 2 is repeated without applying the adhesive coating to the steel plate. The peel strength of the rubber, measured according to ASTM standard D 903-49, is 0.05 kg/cm.

EXAMPLE 4

The experiment in Example 2 is repeated, with the following exceptions:

the rubber is formulated, in a manner known per se, with the use of sulphur and of carbon black with a view to subsequent vulcanization, the thickness of the rubber sheet is 3 mm, and the heat-bonding is performed at 180° C. at the same time as the vulcanization.

The peel strength of the vulcanized rubber, measured according to ASTM standard D 903-49, is 3.5 kg/cm.

EXAMPLE 5 (COMPARATIVE)

The experiment of Example 4 is repeated without applying an adhesive coating to the steel plate. The peel strength of the vulcanized rubber, measured according to ASTM standard D 903-49, is 0.05 kg/cm.

EXAMPLE 6

A solution containing 40 parts of a terpolymer with a flow index of 70 dg/min and containing 94.3 mol% of ethylene, 4.7 mol% of butyl acrylate and 1 mol% of maleic anhydride and 60 parts of butyl phthalate is produced by mixing the constituents with stirring at 60° C.

A steel component is dipped in the solution which is heated to 100° C. On cooling, the solution gradually solidifies to form a waxy solid having good adhesion to the steel, without removal of the solvent.

EXAMPLE 7

0.5 parts of silicone oil are added to 100 parts of the solution obtained in Example 6. After application under the same conditions followed by cooling, a readily peelable protective film is obtained; the surface of the steel component is unchanged.

EXAMPLE 8

A solution is produced, containing 50 parts of a terpolymer with a flow index of 150 dg/min and comprising 92.3 mol% of ethylene, 6.7 mol% of ethyl acrylate and 1 mol% of maleic anhydride, and 50 parts of xylene.

48 parts of this solution are poured into an aqueous phase containing 48 parts of water, 0.24 part of $NH_4OH$, 1.9 parts of methanol, 1.2 parts of a propylene oxide/ethylene oxide emulsifier and 0.09 part of a copolyacrylamide stabilizer, 40% of which is in ionized form.

The emulsion is applied as a dot pattern onto a cloth through a grid and is then dried very rapidly. The coated cloth obtained is then passed over a calender roll heated to 180° C. at the same time as another cloth, to which the coated cloth adheres firmly.

The same emulsion is applied in the same manner after diethanolamine has been added to it in a quantity corresponding to double the stoichiometric quantity based on the anhydride groups.

A lamination which is particularly resistant to cleaning solvents is obtained in this manner.

What is claimed is:

1. A process for bonding two substrates by means of an adhesive, characterized in that the adhesive is a liquid mixture consisting essentially of at least one ethylene polymer (A) and at least one solvent (B), wherein:
   (a) the ethylene polymer (A) comprises at least one terpolymer with a flow index of between 2 and 500 dg/min, the terpolymer consisting essentially of:
   from 83–95.7 mol% of units derived from ethylene,
   from 4–15 mol% of units derived from at least one alkylacrylate or alkyl methyacrylate, the alkyl group containing 1 to 6 carbon atoms, and
   from 0.3 to 2 mol% of units derived from maleic anhydride,
   (b) the solvent (B) is chosen from aliphatic, alicyclic and aromatic hydrocarbons containing from 5 to 12 carbon atoms, esters and chlorinated solvents.

2. A liquid mixture comprising:
   (a) at least one ethylene polymer (A) comprising at least one terpolymer with a flow index of between 2 and 500 dg/min, the terpolymer comprising:
   (i) from 83 to 95.7 mol% of units derived from ethylene;
   (ii) from 4 to 15 mol% of units derived from at least one alkyl acrylate or alkyl methacrylate, the alkyl group containing from 1 to 6 carbon atoms; and
   (iii) from 0.3 to 2 mol% of units derived from maleic anydride;
   (b) at least one solvent (B) chosen from aliphatic, alicyclic and aromatic hydrocarbons containing from 5 to 12 carbon atoms, esters and chlorinated solvents; and
   (c) a release agent.

3. The liquid mixture according to claim 2, wherein the release agent is silicone oil.

4. A liquid mixture comprising:
   (a) at least one ethylene polymer (A) comprising at least one terpolymer with a flow index of between 2 and 500 dg/min, the terpolymer comprising:
   (i) from 83 to 95.7 mol% of units derived from ethylene;
   (ii) from 4 to 15 mol% of units derived from at least one alkyl acrylate or alkyl methacrylate, the alkyl group containing from 1 to 6 carbon atoms; and
   (iii) from 0.3 to 2 mol% of units derived from maleic anhydride;
   (b) at least one solvent (B) chosen from aliphatic, alicyclic and aromatic hydrocarbons containing from 5 to 12 carbon atoms, esters and chlorinated solvents; and
   (c) from 50 to 200 parts by weight of water containing at least one surface-active agent per 100 parts by weight of the mixture of the polymer (A) and the solvent (B).

5. The liquid mixture according to claim 4, characterized in that the surface-active agent is a nonionic agent which is present in a proportion of 0.5 to 10% by weight based on the polymer (A).

6. The liquid mixture according to claim 4, characterized in that the liquid mixture further comprises at least one antifoaming agent in a proportion of at most 5% by weight based on the water.

7. The liquid mixture according to claim 4, characterized in that the liquid mixture further comprises at least one agent for modifying the terpolymer chemically in a proportion of at most 2 mol% based on the terpolymer.

8. The liquid mixture according to claim 4, characterized in that the liquid mixture further comprises at least one water-soluble polymeric stabilizer in a proportion of 0.01 to 0.2% by weight based on the water.

9. A process for bonding two substrates comprising the steps of applying an adhesive to at least one of said substrates, wherein the adhesive is a liquid emulsion of claim 4 or is the product obtained after evaporation of the solvent and evaporation of the water in the liquid emulsion of claim 4, and bringing said two substrates together to be bonded by said adhesive.

10. A process for producing aqueous emulsions according to claim 4, comprising the steps of in a first stage, dissolving the polymer (A), by stirring, in the solvent (B) at a temperature expressed in degrees centigrade such that $35 \leq T \leq \theta$, $\theta$ being the boiling point temperature of the solvent (B), and in a second stage, gradually adding, with intensive stirring at a temperature of between 35° and 100° C., a mixture of water and a surface-active agent.

11. The process according to claim 10, wherein the water and the surface active agent are added with at least one additive selected from an antifoaming agent and a chemical modifier.

12. A process for producing aqueous emulsions according to claim 4, comprising the steps of in a first stage, dissolving the polymer (A), by stirring, in the solvent (B) at a temperature expressed in degrees centigrade such that $35 \leq T \leq \theta$, $\theta$ being the boiling point temperature of the solvent (B), and in a second stage, gradually adding with stirring the solution produced in the first stage, at a temperature of between 35° and 100° C., into a mixture of water and a surface-active agent.

13. The process according to claim 12, wherein the water surface active agent is added with at least one additive selected from an antifoaming agent and a chemical modifier.

* * * * *